(12) United States Patent
Yu et al.

(10) Patent No.: US 8,568,859 B2
(45) Date of Patent: Oct. 29, 2013

(54) DOUBLE-CELL STRUCTURE FOR WINDOW SHADE AND MANUFACTURE METHOD THEREOF

(75) Inventors: Fu-Lai Yu, Taipei Hsieh (TW); Chin-Tien Huang, Taipei Hsieh (TW)

(73) Assignee: Teh Yor, Co., Ltd., Taipei (TW)

( * ) Notice: Subject to any disclaimer, the term of this patent is extended or adjusted under 35 U.S.C. 154(b) by 374 days.

(21) Appl. No.: 12/806,599

(22) Filed: Aug. 17, 2010

(65) Prior Publication Data

US 2011/0274887 A1    Nov. 10, 2011

(30) Foreign Application Priority Data

May 10, 2010 (CN) .......................... 2010 1 0180503

(51) Int. Cl.
B32B 3/12 (2006.01)
E06B 3/94 (2006.01)
E06B 9/06 (2006.01)

(52) U.S. Cl.
USPC ........ 428/178; 428/116; 428/181; 160/84.01; 160/84.04; 160/84.05; 160/115

(58) Field of Classification Search
USPC ............... 428/116, 118, 178, 181; 160/84.01, 160/84.03, 84.04, 84.05, 115, 348
See application file for complete search history.

(56) References Cited

U.S. PATENT DOCUMENTS

| | | |
|---|---|---|
| 2,201,356 A | 5/1940 | Terrell |
| 4,019,554 A | 4/1977 | Rasmussen |
| RE30,254 E | 4/1980 | Rasmussen |
| 4,288,485 A | 9/1981 | Suominen |
| 4,307,768 A | 12/1981 | Anderson |
| 4,347,887 A | 9/1982 | Brown |
| 4,388,354 A | 6/1983 | Suominen |
| 4,631,217 A | 12/1986 | Anderson |
| 4,647,488 A | 3/1987 | Schnebly et al. |
| 4,673,600 A | 6/1987 | Anderson |
| 4,676,855 A | 6/1987 | Anderson |
| 4,677,012 A | 6/1987 | Anderson |
| 4,677,013 A | 6/1987 | Anderson |
| 4,685,986 A | 8/1987 | Anderson |
| 4,698,276 A | 10/1987 | Duval |
| 4,795,515 A | 1/1989 | Kao et al. |
| 4,861,404 A | 8/1989 | Neff |
| 4,884,612 A | 12/1989 | Schnebly et al. |
| 4,928,369 A | 5/1990 | Schnebly et al. |
| 4,943,454 A | 7/1990 | Neff |
| 4,974,656 A | 12/1990 | Judkins |
| 4,984,617 A | 1/1991 | Corey |
| 5,002,628 A | 3/1991 | Schnebly |
| 5,015,317 A | 5/1991 | Corey et al. |

(Continued)

FOREIGN PATENT DOCUMENTS

| | | |
|---|---|---|
| CA | 2144280 | 9/1995 |
| CA | 2181112 | 9/1999 |

(Continued)

*Primary Examiner* — Donald J Loney
(74) *Attorney, Agent, or Firm* — Olson & Cepuritis, Ltd.

(57) ABSTRACT

The present invention provides a double cell structure for window shade and its manufacture method for forming a substrate of double cell units. The substrate comprises first and second strip material bonded with each other, two lateral sides of the substrate being formed by first and second pleats. The substrate can then be cut to form multiple double cell units that are then stacked and bonded over one another for forming the double cell structure. In addition, the present invention also provides double cell structures for window shade.

7 Claims, 15 Drawing Sheets

(56) References Cited

U.S. PATENT DOCUMENTS

| | | |
|---|---|---|
| RE33,623 E | 6/1991 | Anderson |
| 5,043,038 A | 8/1991 | Colson |
| 5,043,039 A | 8/1991 | Swiszcz |
| 5,090,098 A | 2/1992 | Seveik et al. |
| 5,097,884 A | 3/1992 | Seveik et al. |
| 5,104,469 A | 4/1992 | Colson |
| 5,106,444 A | 4/1992 | Corey et al. |
| 5,129,440 A | 7/1992 | Colson |
| 5,158,632 A | 10/1992 | Colson et al. |
| 5,160,563 A | 11/1992 | Kutchmarek et al. |
| 5,176,192 A | 1/1993 | Judkins et al. |
| 5,188,160 A | 2/1993 | Jelic |
| 5,193,601 A | 3/1993 | Corey et al. |
| 5,205,334 A | 4/1993 | Judkins |
| 5,207,257 A | 5/1993 | Rupel et al. |
| 5,228,936 A | 7/1993 | Goodhue |
| 5,287,908 A | 2/1994 | Hoffmann et al. |
| 5,313,998 A | 5/1994 | Colson et al. |
| 5,313,999 A | 5/1994 | Colson et al. |
| 5,339,882 A | 8/1994 | Judkins |
| 5,339,883 A | 8/1994 | Colson et al. |
| D352,856 S | 11/1994 | Ford |
| D353,503 S | 12/1994 | Belue |
| 5,390,720 A | 2/1995 | Colson et al. |
| 5,392,832 A | 2/1995 | Colson et al. |
| 5,394,922 A | 3/1995 | Colson et al. |
| 5,419,385 A | 5/1995 | Vogel et al. |
| 5,425,408 A | 6/1995 | Colson |
| 5,454,414 A | 10/1995 | Colson et al. |
| 5,456,304 A | 10/1995 | Colson et al. |
| 5,482,750 A | 1/1996 | Colson et al. |
| 5,490,553 A | 2/1996 | Colson et al. |
| 5,503,210 A | 4/1996 | Colson et al. |
| 5,525,395 A | 6/1996 | Huang |
| 5,558,925 A | 9/1996 | Fritzman |
| 5,601,885 A | 2/1997 | Akins |
| 5,603,368 A | 2/1997 | Colson et al. |
| 5,620,035 A | 4/1997 | Judkins |
| 5,630,898 A | 5/1997 | Judkins |
| 5,630,900 A | 5/1997 | Huang |
| 5,670,000 A | 9/1997 | Colson et al. |
| 5,680,891 A | 10/1997 | Prince |
| 5,690,778 A | 11/1997 | Swiszcz et al. |
| 5,691,031 A | 11/1997 | Swiszcz et al. |
| 5,692,550 A | 12/1997 | Ford et al. |
| 5,701,940 A | 12/1997 | Ford et al. |
| 5,702,552 A | 12/1997 | Kutchmarek et al. |
| 5,706,876 A | 1/1998 | Lysyj |
| 5,746,266 A | 5/1998 | Colson et al. |
| 5,747,123 A | 5/1998 | Fritzman |
| 5,787,951 A | 8/1998 | Tonomura et al. |
| 5,834,090 A | 11/1998 | Huang |
| 5,837,084 A | 11/1998 | Barss |
| 5,888,639 A | 3/1999 | Green et al. |
| 5,897,731 A | 4/1999 | Colson et al. |
| 5,974,763 A | 11/1999 | Colson et al. |
| 6,019,864 A | 2/2000 | Jones |
| 6,045,890 A | 4/2000 | Green et al. |
| 6,052,966 A | 4/2000 | Colson et al. |
| 6,066,382 A | 5/2000 | Swiszcz et al. |
| 6,103,336 A | 8/2000 | Swiszcz |
| 6,284,347 B1 | 9/2001 | Green et al. |
| 6,302,181 B1 | 10/2001 | Rupel |
| 6,302,982 B1 | 10/2001 | Corey et al. |
| 6,319,586 B1 | 11/2001 | Colson |
| 6,345,486 B1 | 2/2002 | Colson et al. |
| D456,196 S | 4/2002 | Colson et al. |
| 6,377,384 B2 | 4/2002 | Corey et al. |
| 6,416,842 B1 | 7/2002 | Swiszcz et al. |
| 6,440,247 B2 | 8/2002 | Rupel et al. |
| 6,461,464 B1 | 10/2002 | Swiszcz |
| 6,513,565 B1 | 2/2003 | Rupel et al. |
| 6,527,895 B1 | 3/2003 | Palmer |
| 6,599,609 B2 | 7/2003 | Johnson |
| 6,673,176 B2 | 1/2004 | Rupel |
| 6,740,389 B2 | 5/2004 | Yu |
| 6,767,615 B1 | 7/2004 | Judkins et al. |
| D493,650 S | 8/2004 | Tuzmen |
| D497,276 S | 10/2004 | Tyner |
| D498,105 S | 11/2004 | Tyner |
| D501,749 S | 2/2005 | Gruner |
| 6,854,501 B2 | 2/2005 | Corey |
| 6,908,661 B2 | 6/2005 | Green et al. |
| 6,982,020 B2 | 1/2006 | Swiszcz et al. |
| 6,989,066 B2 | 1/2006 | Yu |
| D515,345 S | 2/2006 | Herhold et al. |
| 7,100,663 B2 | 9/2006 | Zhang et al. |
| 7,159,634 B1 | 1/2007 | Judkins |
| 7,182,120 B1 | 2/2007 | Judkins |
| 7,404,428 B2 | 7/2008 | Sun et al. |
| 7,541,082 B2 | 6/2009 | Yu |
| D600,057 S | 9/2009 | Cha |
| 2002/0033243 A1 | 3/2002 | Allsopp |
| 2003/0075284 A1 | 4/2003 | Rupel et al. |
| 2006/0174999 A1 | 8/2006 | Rupel et al. |
| 2010/0065228 A1 | 3/2010 | Barss |

FOREIGN PATENT DOCUMENTS

| | | |
|---|---|---|
| CN | 1126060 A | 7/1996 |
| CN | 2469834 Y | 1/2002 |
| CN | 1493241 | 5/2004 |
| CN | 201424922 | 3/2010 |
| CN | 201424919 | 3/2012 |
| EP | 0 380 271 A2 | 8/1990 |
| EP | 0 455 914 A2 | 11/1991 |
| EP | 0 873 463 A1 | 10/1998 |
| EP | 1 415 797 A2 | 5/2004 |
| GB | 756270 | 9/1956 |
| GB | 2 247 698 A | 3/1992 |

DOUBLE-CELL STRUCTURE FOR WINDOW SHADE AND MANUFACTURE METHOD THEREOF

CROSS-REFERENCE TO RELATED APPLICATION

This application claims priority under 35 U.S.C. 119 to Chinese Patent Application No. 201010180503.3 filed on May 10, 2010.

FIELD OF THE INVENTION

The present invention relates to double-cell structures for window shades and manufacture methods thereof.

BACKGROUND OF THE INVENTION

Conventionally, a double-cell type window shade includes a honeycomb structure, a head rail, a bottom rail, and multiple suspension cords passing through the honeycomb structure. The honeycomb structure usually comprises multiple pairs of front and rear cells that are connected with each other and are stacked vertically between the head and bottom rails. The suspension cords have one end connected with the head rail and another end passing through the honeycomb structure and affixed with the bottom rail. A user can operate the bottom rail to collapse or deploy the honeycomb structure for adjusting the amount of light that passes through the window opening.

To block light, the honeycomb structure usually includes some opaque material. However, opaque materials are usually more expensive than transparent materials. As a result, window shades that extensively use opaque materials for making the honeycomb structure may have higher fabrication cost.

Therefore, there is a need for a structure and manufacture method that can make a honeycomb structure in a cost-effective manner and address at least the foregoing issues.

SUMMARY OF THE INVENTION

The present application describes a double-cell structure for window shade and manufacture method thereof. In one embodiment, the method of fabricating a window shade double-cell structure comprises forming an elongated substrate of double-cell unit. The substrate may comprise a first and second strip of web material bonded with one another and having a length and a depth and a first and second pleat located at two opposite sides of the substrate. The elongated substrate may be cut to form a plurality of double-cell units according to a desired width of the window shade. The plurality of double-cell units may be bonded to one another to form the double-cell structure.

In another embodiment, a double-cell structure for the window shade includes a plurality of double-cell units bonded with one another in a vertical configuration, wherein each of the double-cell units comprises a first strip of web material and a second strip of web material. The first strip of web material includes two pleats formed at corresponding rear and front sides of the window shade and define a base and two side portions. The two side portions of the first strip of material each include end portions that are bonded to an outer side of an adjacent first strip of material at an adjacent double-cell unit. The second strip of web material includes a first and second distal end, wherein the first distal end is bonded with the base of the first strip of web material and the second distal end of the second strip of material are also bonded with the adjacent first strip of web material at the adjacent double-cell unit.

In another embodiment, the double-cell structure for the window shade includes a plurality of double-cell units bonded with one another in a vertical configuration, wherein each of the double-cell units comprise a first strip of web material and a second strip of web material. The first strip of web material includes a first pleat that defines a first base and a first side portion. The second strip of web material includes a second pleat that defines a second base and a second side portion. The first and second strip of web material are bonded with each other such that a distal end of the first side portion of the first strip of material and a distal end of the second base of the second strip of material are bonded with an outer side of an adjacent first strip of web material at an adjacent double-cell unit. In addition, a distal end of the second side portion of the second strip of material and a distal end of the first base of the first strip of material are bonded with an outer side of an adjacent second strip of web material at an adjacent double-cell unit. This double-cell configuration permits the first strips of web material to be bonded with one another such that they are visible from a first outer side of the double-cell structure and permits the second strips of web material to be bonded with one another such that they are visible from a second outer side of the double-cell structure opposite to the first outer side thereof.

DETAILED DESCRIPTION OF THE PREFERRED EMBODIMENTS OF THE INVENTION

Figure 1:
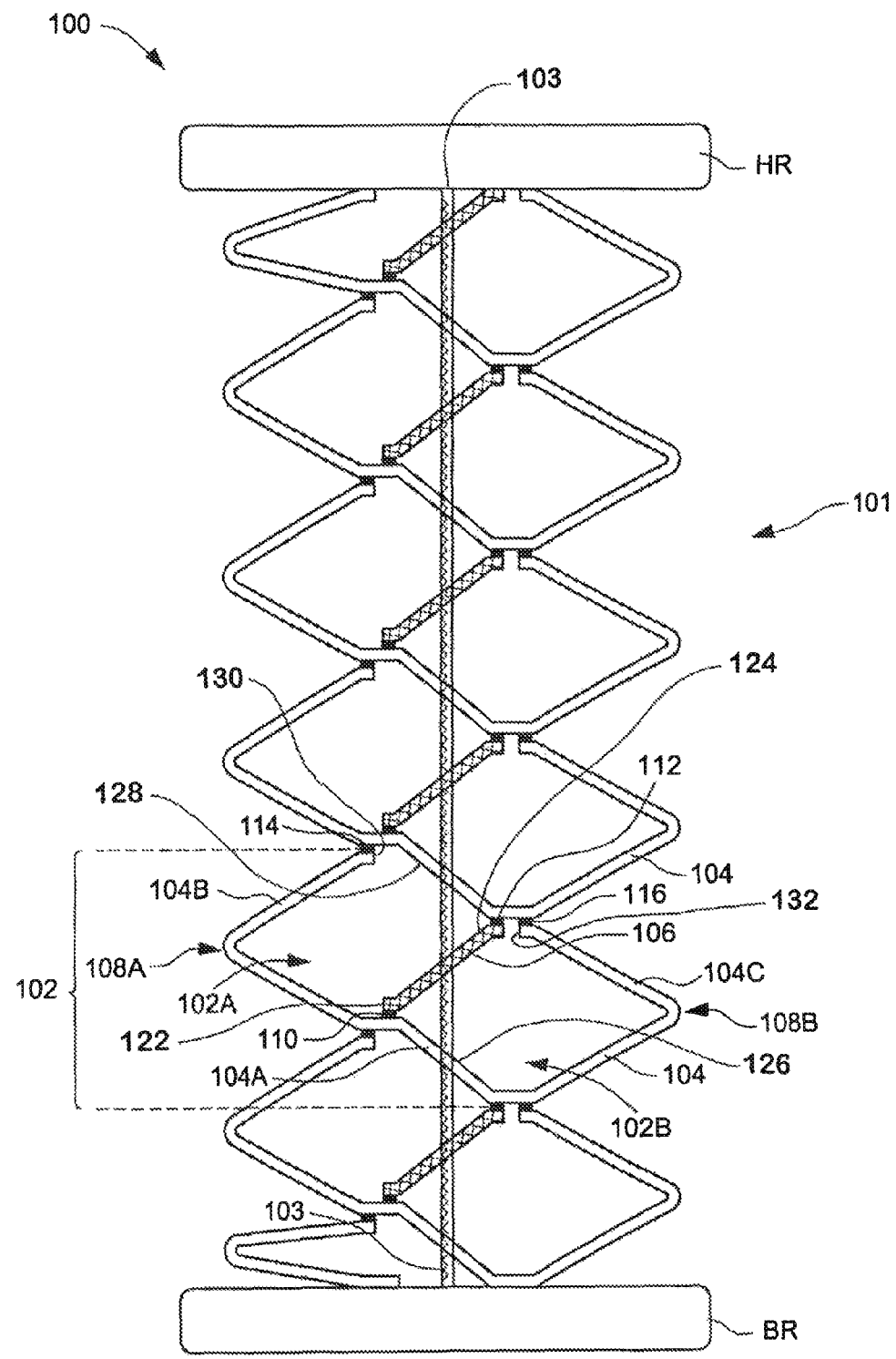
FIG. 1 is a side view illustrating one embodiment of a double-cell window shade in a deployed state.

The invention disclosed herein is susceptible to embodiment in many different forms. The embodiment shown in the drawings and described in detail below is only for illustrative purposes. The disclosure is intended as an exemplification of the principles and features of the invention, but does not limit the invention to the illustrated embodiments.

A window shade covering may include a double-cell structure formed from a plurality of double-cell units. Each double-cell unit may be formed by two strips of material and may include two opposite sides each having a pleat formed thereon. The first strip of web material and a second strip of web material may be folded and bonded together to form the elongated substrate and then cut to form the double-cell unit. The double-cell unit may then be stacked and bonded with other double-cell units in a vertical configuration to form the double-cell structure.

Figure 2:
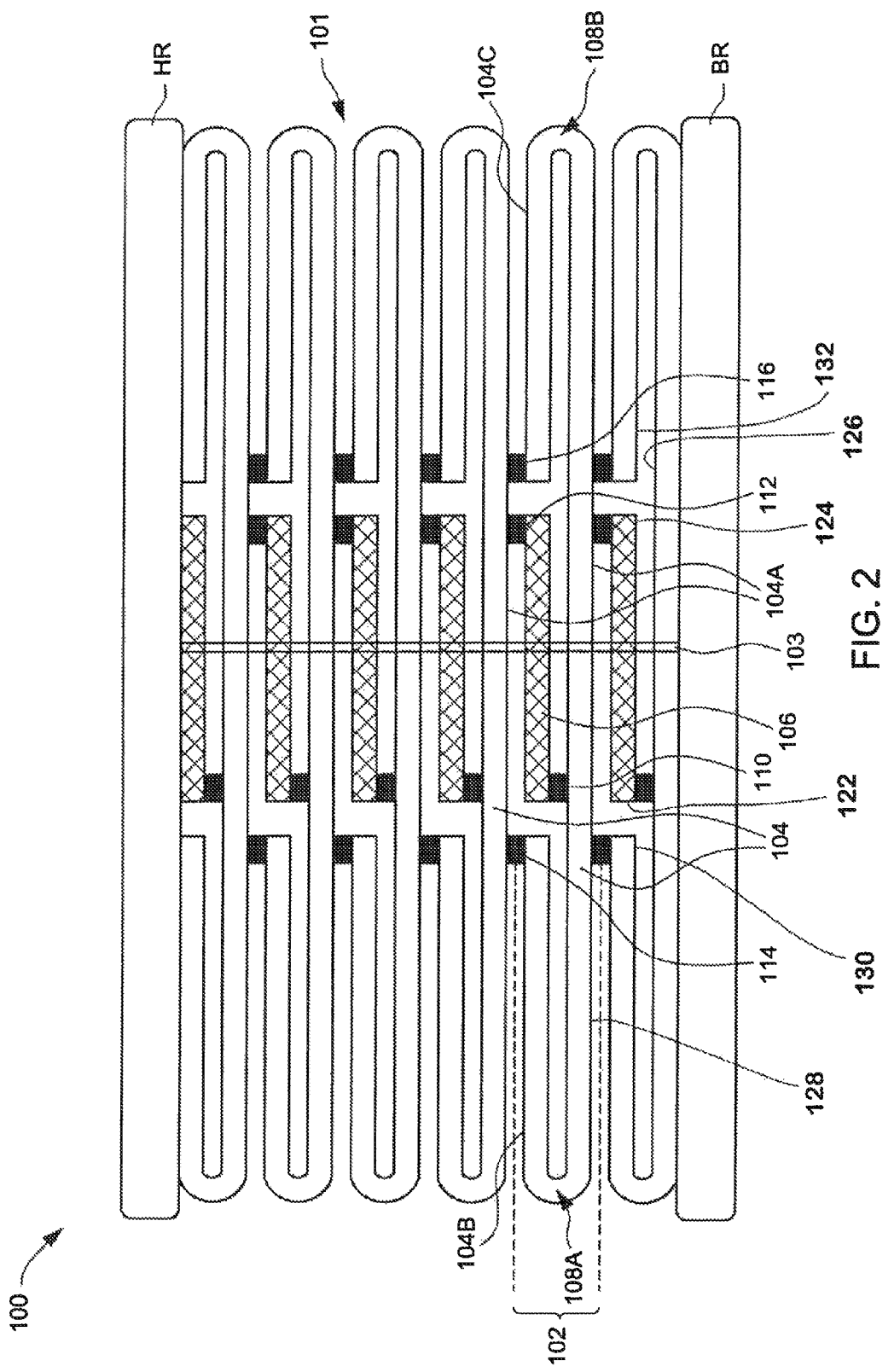
FIG. 2 is a side view illustrating the double-cell window shade of FIG. 1 in a retracted state.

FIGS. 1-2 illustrate one embodiment of a double-cell window shade assembly 100 having a double-cell window shade covering in a deployed and retracted state. As shown, the window shade assembly 100 comprises a head rail HR, a bottom rail BR, a double-cell structure 101, and at least one suspension cord 103 connected between the head rail HR and bottom rail BR.

The double-cell structure 101 may include a plurality of double-cell units 102 that are stacked vertically. Each double-cell unit 102 may have a similar structure including a first and second cell 102A and 102B located at the front and rear side of the double-cell unit 102. The first and second cells 102A and 102B are enclosed cavities that are positioned adjacent to each other and may be formed by at least two or more strips of web materials. In one example, each double-cell unit 102 may be made by connecting at least a first strip of web material 104 and a second strip of web material 106.

The first strip of web material 104 includes a first and second pleat 108A and 108B that define a base 104A and first and second side portions 104B and 104C. The base 104A is located between the two pleats 108A and 108B and joins the first side portion 104B at the first pleat 108A. The second side portion 104C and the base 104A are joined with each other at the second pleat 108B. As shown in FIGS. 1-2, the first and second pleat 108A and 108B are located at two opposite sides of the double-cell structure 101 and respectively correspond to the front and rear of the window shade assembly 100.

The second strip of web material 106 is connected between the two side portions 104B and 104C and forms a boundary sidewall between the first and second cell 102A and 102B. Specifically, the second strip of web material 106 includes a first distal end 122 which may be bonded with an inner surface 126 of the base 104A via a strip of glue 110. The second strip of web material 106 also includes a second distal end 124 which may be bonded with an outer surface 128 of an adjacent base 104A of an adjacent first strip of web material 104 at an adjacent double-cell unit 102 via a strip of glue 112. The side portions 104B and 104C of the first strip of web material 104 also include distal ends 130 and 132 which may be bonded with the outer surface 128 of the adjacent base 104A of the adjacent first strip of web material 104 at the adjacent double-cell unit 102. The distal ends 130 and 132 may be bonded with the adjacent first strip of web material 104 via strips of glue 114 and 116, respectively. In particular, the second distal end 124 of the second strip of web material 106 and the distal end 132 of the side portion 104C of the first strip of web material 104 may be bonded at adjacent locations within close proximity of one another at the outer surface 128 of the adjacent base 104A.

The double-cell structure 101 may be fabricated such that each cell has four sides. In one example, at least two sides of each first cell 102A may be formed by the first strip of web material 104 and the two other sides may be formed by one second strip of web material 106 and the adjacent first strip of web material 104 at the adjacent double-cell unit 102. In turn, at least three sides of each second cell 102B are formed by the first strip of web material 104 and the last side of the second cell 102B is formed by the second strip of web material 106. This configuration permits fabrication of the first and second cells 102A and 102B formed entirely by three strips of web material where the first strips of web material 104 are visible from the front or back exterior of the window shade assembly 100 and the second strips of web material 106 are concealed within the double-cell structure 101.

The double-cell structure may be formed by gluing together the first and second strips of web material 104 and 106 or by any other technique for bonding the first and second strips 104 and 106, such as welding, ultrasonic welding, etc. The first and second strips of web material 104 and 106 may be formed from the same or different types of materials. In one example, the first strips of web material 104 may be formed from a material that has a rate of light transmission higher than that of the second strips of web material 106, or conversely. In this manner, the window shade 100 can produce different and contrasted light shadowing effects, yielding to a unique aesthetic aspect. Examples of suitable materials for the first and second strips of web materials 104 and 106 can include spun-lace non-woven fabric, point-bonded non-woven fabric, or like fabric materials.

The at least one suspension cord 103 can pass through each double-cell unit 102, and oppositely connect with the head rail HR and bottom rail BR. A user can displace the bottom rail BR upward or downward to collapse (FIG. 2) or deploy (FIG. 1) the double-cell structure 101.

Figure 3:
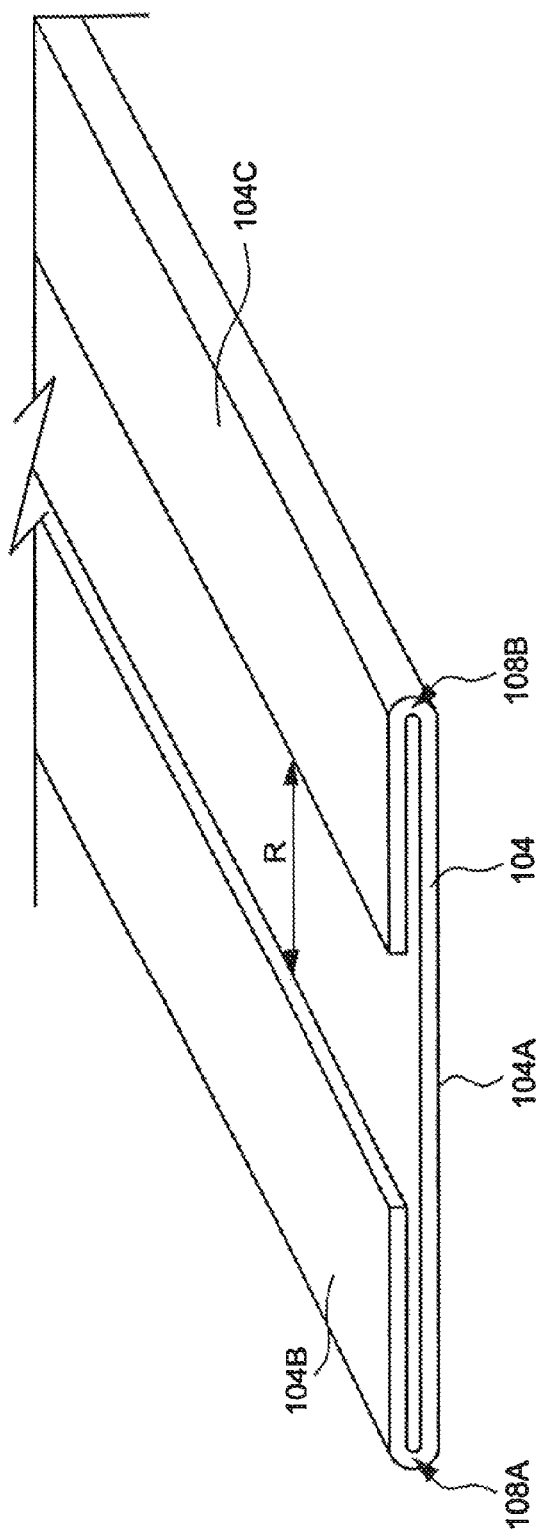
FIG. 3 is a side perspective view illustrating a stage in the fabrication of a substrate of double-cell units used in the double-cell structure of FIG. 1.

FIGS. 3-7 illustrate stages of a method of fabricating the double-cell structure 101 shown in FIGS. 1-2. As shown in FIG. 3, the first strip of web material 104 may first be folded to form the first and second pleat 108A and 108B. The first and second pleats 108A and 108B define the base 104A and first and second side portions 104B and 104C. The first and second side portions are located at opposite sides of the base 104A and may be shorter than the length of the base 104A. The first and second side portions 102B and 102C may be folded toward a same side of the base 104A. In one example, the first and second side portions 102B and 102C may be folded toward an inner side of the base 104A.

The base 104A includes a region R that is exposed between the first and second side portions 104B and 104C. In one example, the region R may have a width that is at least equal to or greater than the width of the second strip of web material 106.

Figure 4:
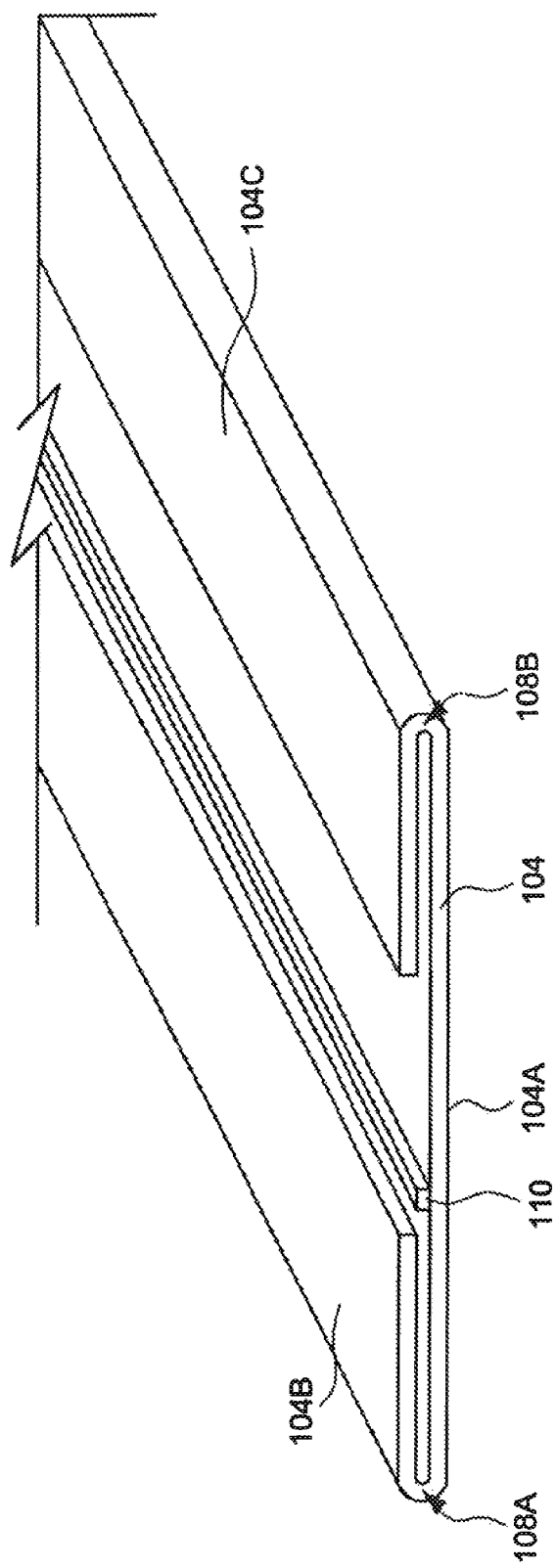
FIG. 4 is a side perspective view illustrating the next stage after FIG. 3 in the fabrication of a substrate of double-cell units used in the double-cell structure of FIG. 1.

Referring to FIG. 4, the strip of glue 110 is then dispensed on the inner surface of the base 104A at the region R and exposed between the two side portions 104B and 104C.

Figure 5:
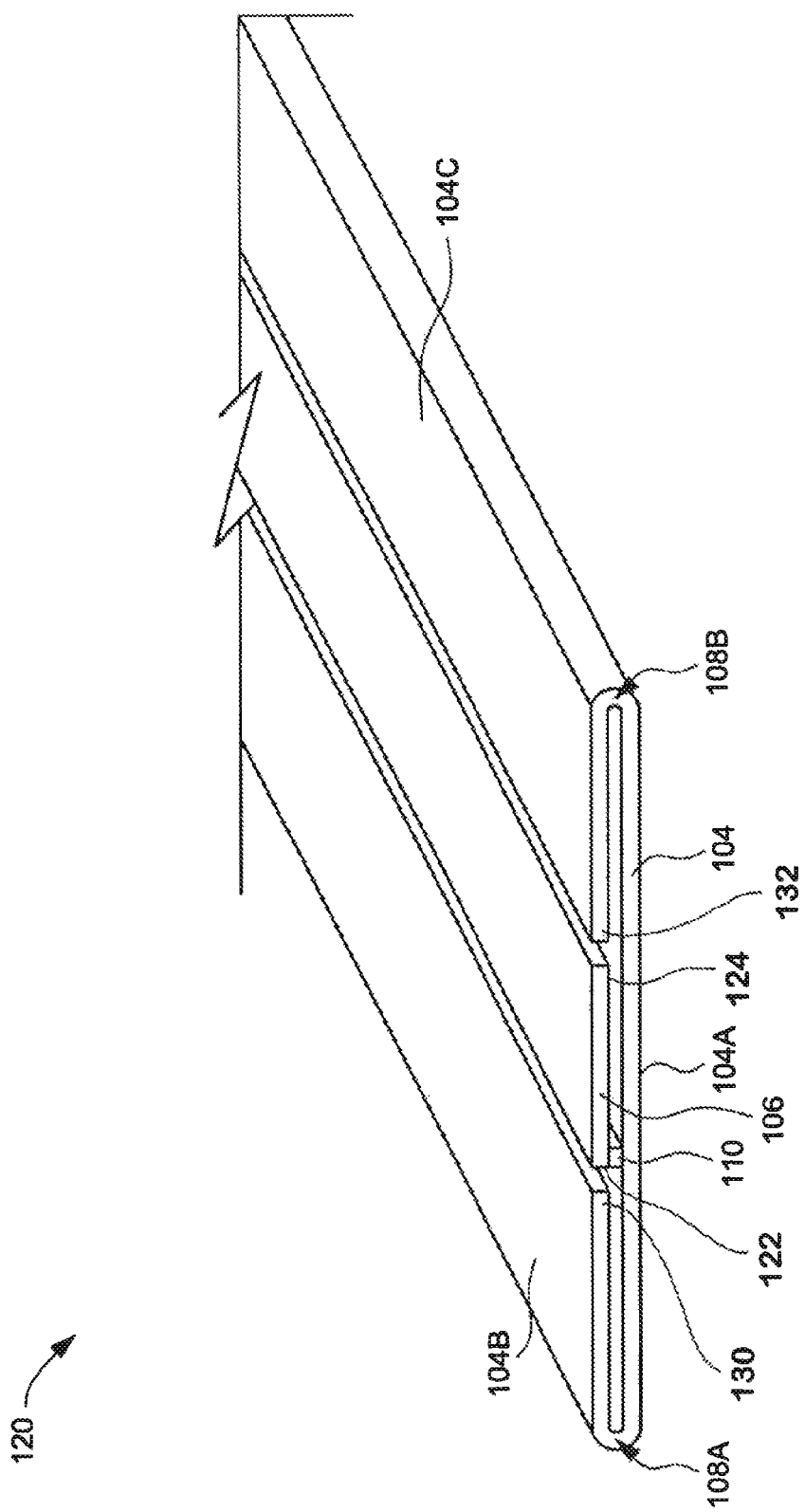
FIG. 5 is a side perspective view illustrating the next stage after FIG. 4 in the fabrication of a substrate of double-cell units used in the double-cell structure of FIG. 1.

Referring to FIG. 5, the second strip of web material 106 is placed in alignment over the region R of the inner surface of the base 104A. In one example, the second strip of web material 106 may be entirely positioned between the two side portions 104B and 104C.

The first distal end 122 of the second strip of web material 106 is adhered via the strip of glue 110 on the inner surface of the base 104A at the region R for forming a substrate 120 from which the double-cell units 102 are cut. The substrate 120 has an elongated shape having both a length and a depth. The length of the substrate 120 may correspond to the length the first and second strips of web material 104 and 106 bonded with each other and the depth of the substrate 120 may be the distance between the two opposite pleats 108A and 108B. In one example, the substrate 120 may be wound into a log or roll shape for facilitating its storage for subsequent processing steps.

Figure 6:
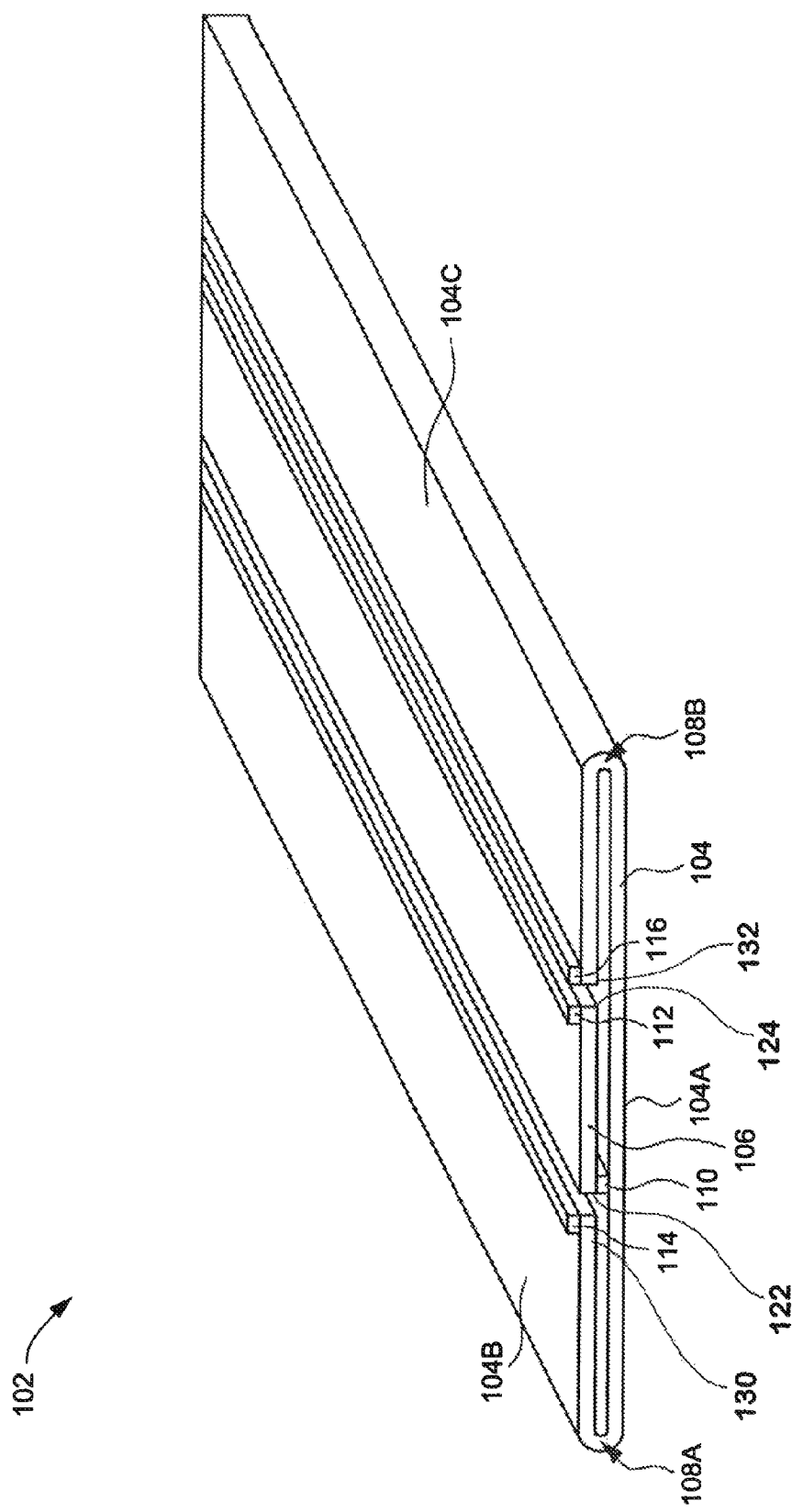
FIG. 6 is a side perspective view illustrating the fabrication of the double-cell structure of FIG. 1 from the substrate shown in FIG. 5.

Referring to FIG. 6, the substrate 120 can be unwound and cut according to a width of the window shade to form one double-cell unit 102. The strips of glue 112, 114 and 116 are then dispensed on a same side of the double-cell unit 102. As shown, the strip of glue 112 can be applied on an outer surface of the second strip of web material 106 at the second distal end 124 that is opposite to the position of the strip of glue 110, whereas the strips of glue 114 and 116 can be respectively applied on the outer surface of the side portions 104B and 104C at distal ends 130 and 132 respectively.

Figure 7:
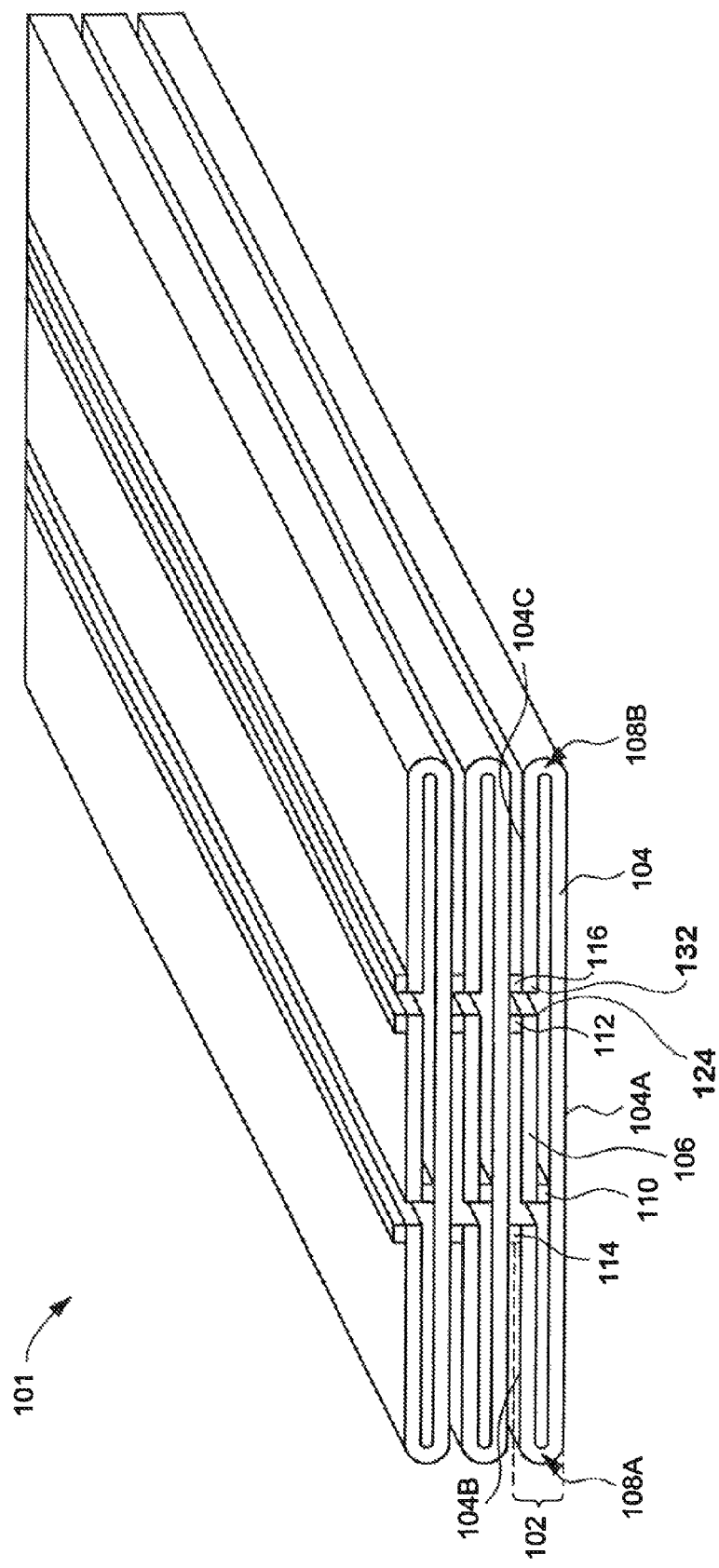
FIG. 7 is a side perspective view illustrating the stacking of the substrate shown in FIG. 5 during the fabrication of the double-cell structure.

Referring to FIG. 7, the double-cell unit 102 with the strips of glue 112, 114 and 116 thereon can be then stacked vertically with another adjacent double-cell unit 102. Specifically, the distal end 124 of the second strip of web material 106 and the first and second side portions 104B and 104C of the first strip of web material 104 may be bonded by the strips of glue 112, 114 and 116 with the outer surface 128 of the adjacent base 104A of the adjacent first strip of web material 104 at the adjacent double-cell unit 102.

As shown in FIG. 7, the second distal end 124 of the second strip of web material 106 and the distal end 132 of the side portion 104C can be bonded via the strips of glue 112 and 116 at close proximate positions on the adjacent base 104A of the adjacent first strip of material 104. Accordingly, two adjacent cells 102A and 102B can be formed with approximately the same size and shape.

Figure 8:
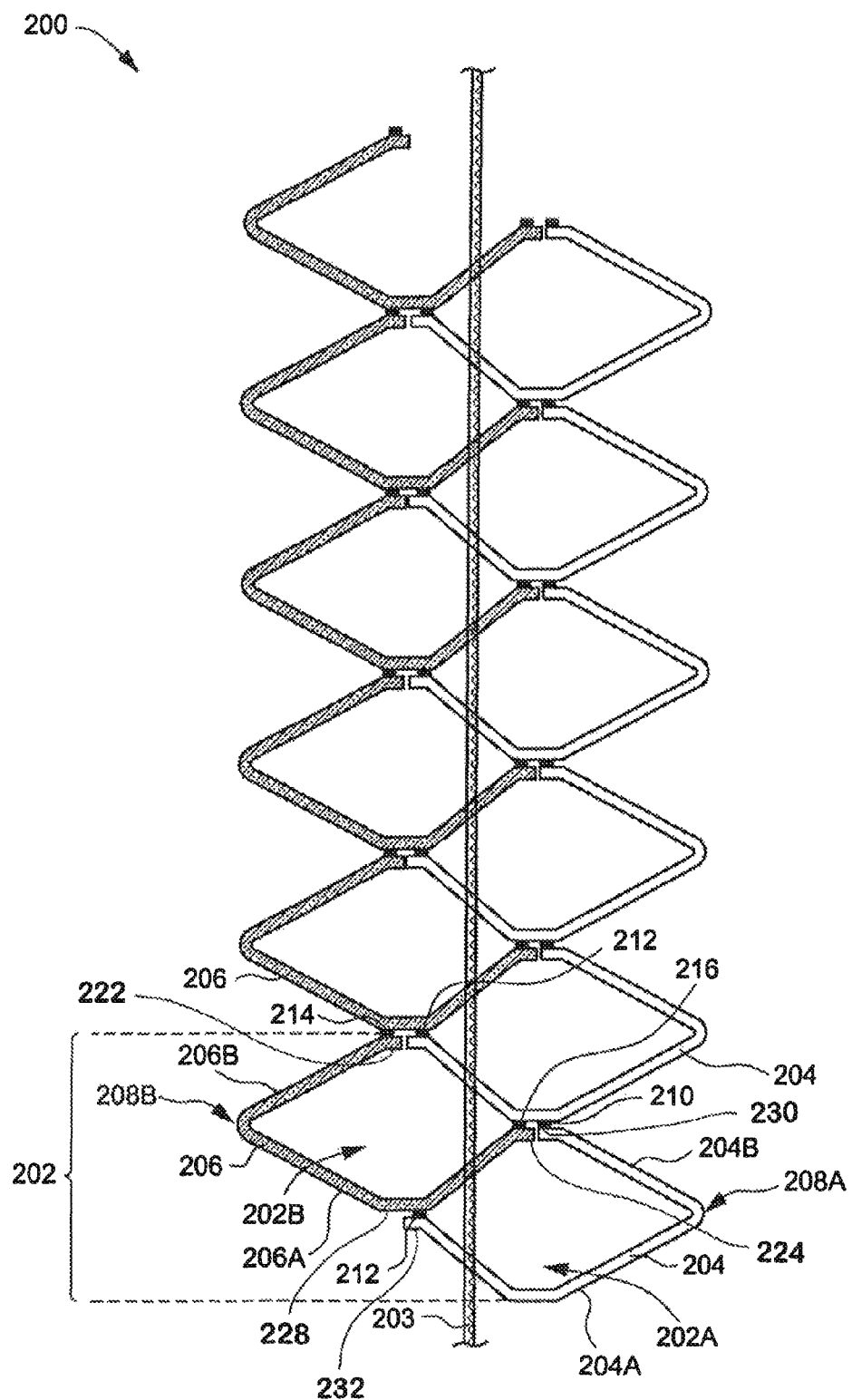
FIG. 8 is a side view illustrating another embodiment of a double-cell structure in a deployed state.
Figure 9:
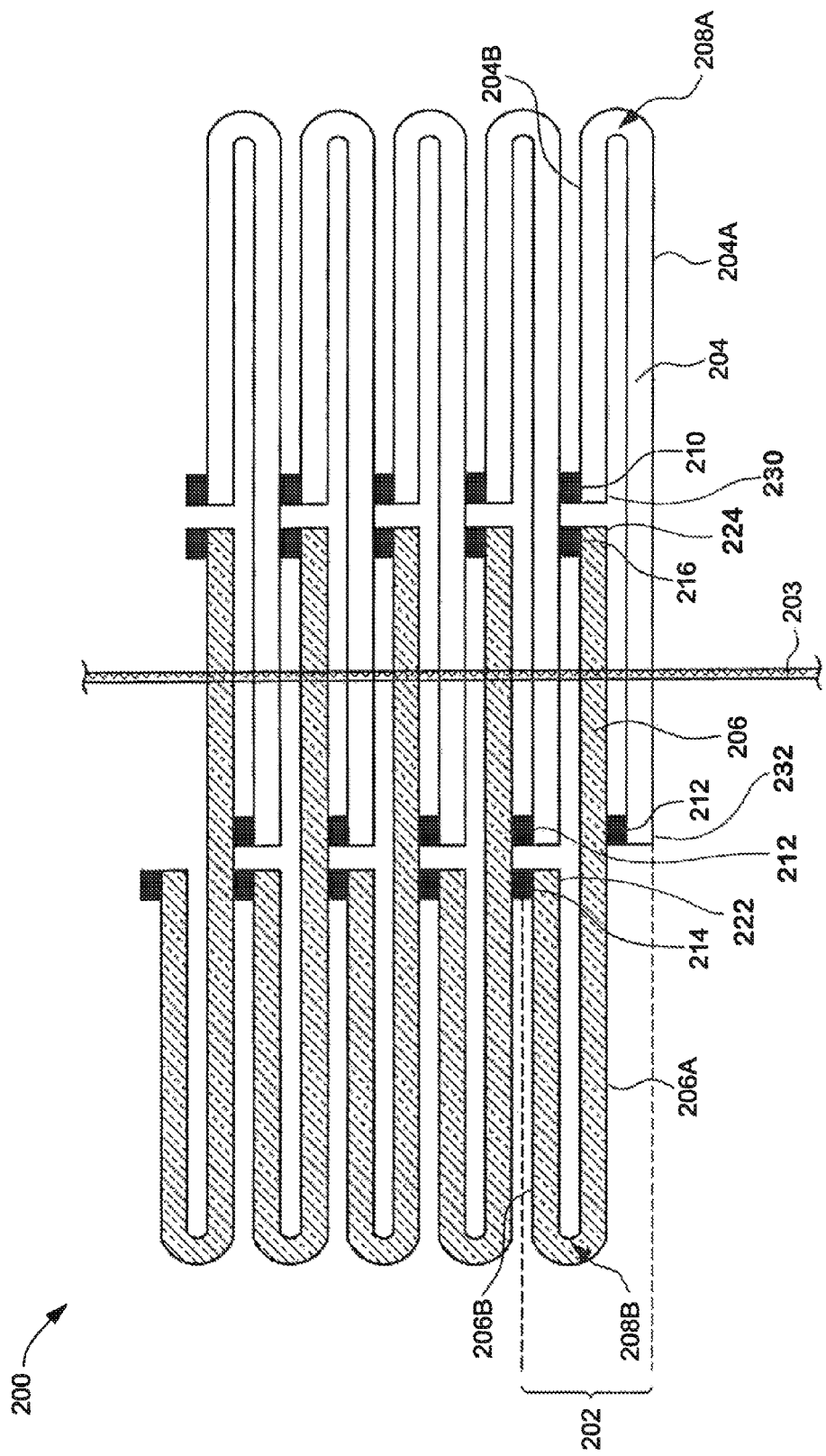
FIG. 9 is a side view illustrating the double-cell structure of FIG. 8 in a retracted state.

FIGS. 8-9 illustrate another embodiment of the double-cell structure 200 in a deployed and collapsed state, respectively. Like the previous embodiment, the double-cell structure 200 includes a plurality of double-cell units 202 bonded to one another in a vertical configuration and may include at least one suspension cord 203. Each of the double-cell units 202 also includes a first and second cell 202A and 202B respectively connected with each other at the front and rear side of the double-cell structure 200. The first and second cells 202A and 202B are enclosed cavities that are positioned adjacent to each other. In one embodiment, the cells 202A and 202B can be formed by at least a first and second strip of web material 204 and 206 bonded with each other.

Specifically, each double-cell unit 202 may be made by connecting at least the first strip of web material 204 and the second strip of web material 206. The first strip of web material 204 may include at least one pleat 208A, and a first base 204A and first side portion 204B that are connected with each other at the pleat 208A. The second strip of web material 206 may include a second pleat 208B, and a second base 206A and second side portion 206B that are connected with each other at the second pleat 208B. The double-cell structure 200 therefore exhibits the first pleats 208A on the front side and the second pleats 208B on the rear side.

As shown in FIGS. 8-9, each first strip of web material 204 has a distal end 232 of the first base 204A having an inner surface that is bonded with an outer surface 228 of the second base 206A of the second strip of web material 206 via a strip of glue 212. A distal end 230 of the first side portion 204B includes an outer surface that is bonded via a strip of glue 210 to an outer surface of an adjacent first base 204A of an adjacent first strip of web material 204 at an adjacent double-cell unit 202. Similarly, the second base 206A has an inner surface that is bonded via a strip of glue 216 at the outer surface of the first base 204A of the adjacent first strip of web material 204 at the adjacent double-cell unit 202.

The second side portion 206B of the second strip of web material 206 has a distal end 222 that is bonded via the strip of glue 214 with an outer surface of an adjacent second base 206A of an adjacent second strip of web material 206 at an adjacent double-cell unit 202. In one example, the bonding location of the strip of glue 214 may be at a location adjacent to and closely proximate the bonding location of the strip of glue 212, such that the two adjacent cells 202A and 202B have approximately the same shape and size. Such double-cell structure can be fabricated in a cost-effective manner and improved aesthetic aspect.

As shown in FIG. 8, each formed cell may have four sides. The first cell 202A has three sides formed by the first strip of web material 204 and one side formed by a portion of the second base 206A of the second strip of web material 206. In turn, the adjacent second cell 202B has three sides formed by the second strip of web material 206 and one side formed by a portion of the adjacent first base 204A of the adjacent first strip of web material 204 at the adjacent double-cell unit 202. The adjacently connected first and second cells 202A and 202B may be completely defined by three strips of web material bonded with one another. The double-cell structure is therefore configured such that the first strips of web material 204 are visible from a first side of the double-cell structure 200, while the second strips of web material 206 are visible from an opposite second side of the double-cell structure 200.

As discussed above the first side portion 204B includes the distal end 230 that is bonded to the adjacent first base 204 of the adjacent first strip of material at the adjacent double-cell unit. The second base 206A includes the distal end 224 that is bonded to the adjacent first base 204 of the adjacent first strip of material at the adjacent double-cell unit. Both distal end 224 of the second base 206A and the distal end 232 of the first side portion 204B may be bonded at a location proximate to one another. However, the first side portion 204B and the second base 206A may be spaced a distance apart from one another.

Similarly, the second side portion 206B includes the distal end 222 that is bonded to the adjacent second base 206A of the adjacent second strip of material at the adjacent double-cell unit. The first base 204A includes the distal end 232 that is also bonded to the adjacent second base of the adjacent second strip of material at the adjacent double-cell unit. Both the distal end 222 of the second side portion 206B and the distal end 232 of the first base portion 204A may be bonded at a location proximate to one another. However, the second side portion 206B and the first base 204A may be spaced a distance apart from one another.

Figure 10:
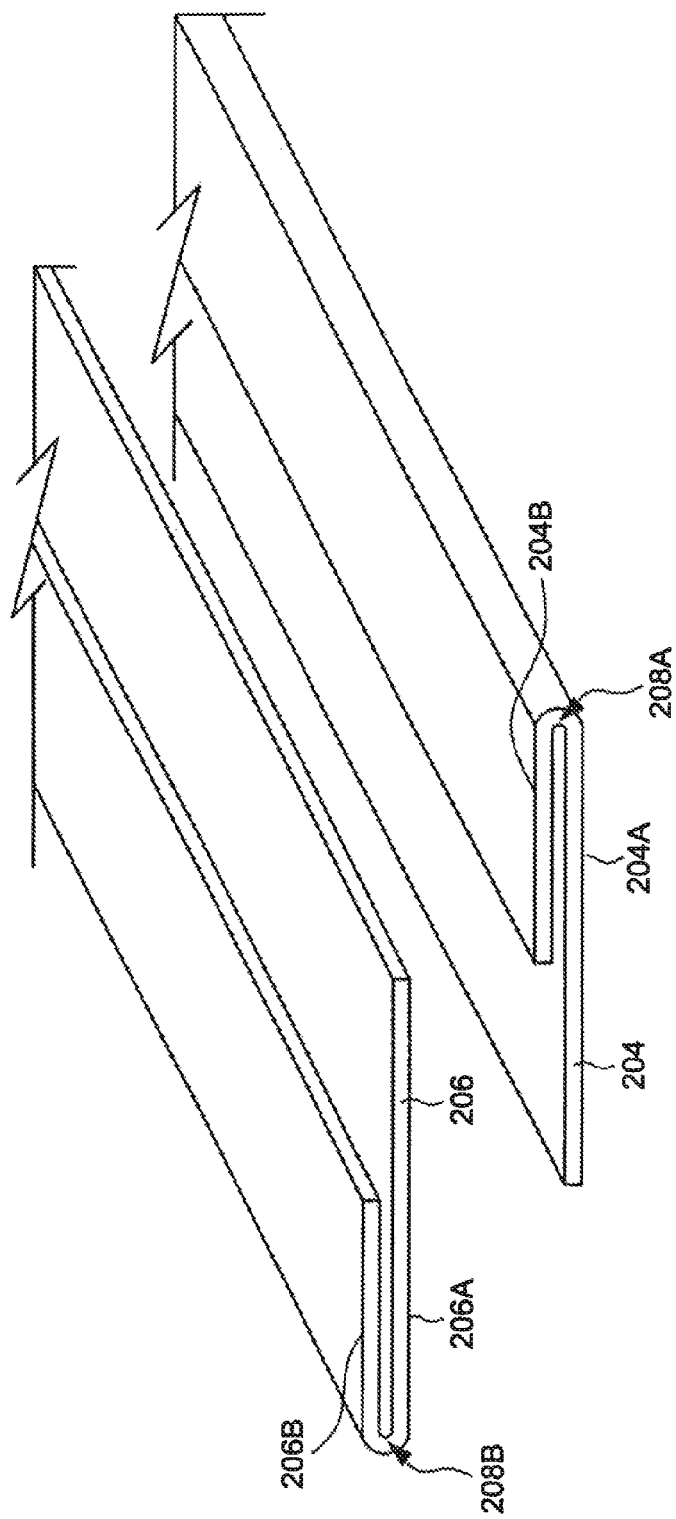
FIG. 10 is a side perspective view of a stage in the fabrication of a substrate of double-cell units used in the double-cell structure of FIG. 8.

FIGS. 10-14 illustrate stages of a method of fabricating the double-cell structure 202. As shown in FIG. 10, a first and second strip of web material 204 and 206 are first provided. The first strip of web material 204 is folded over itself to form a pleat 208A, a first base 204A and a first side portion 204B. The second strip of web material 206 is also folded over itself to form a pleat 208B, a second base 206A and a second side portion 206B. The first side portion 204B may be shorter than the base 204A and may fold toward an inner side of the first base 204A. The second side portion 206B may also be shorter than the second base 206A and may fold toward an inner side of the second base 206A.

Figure 11:
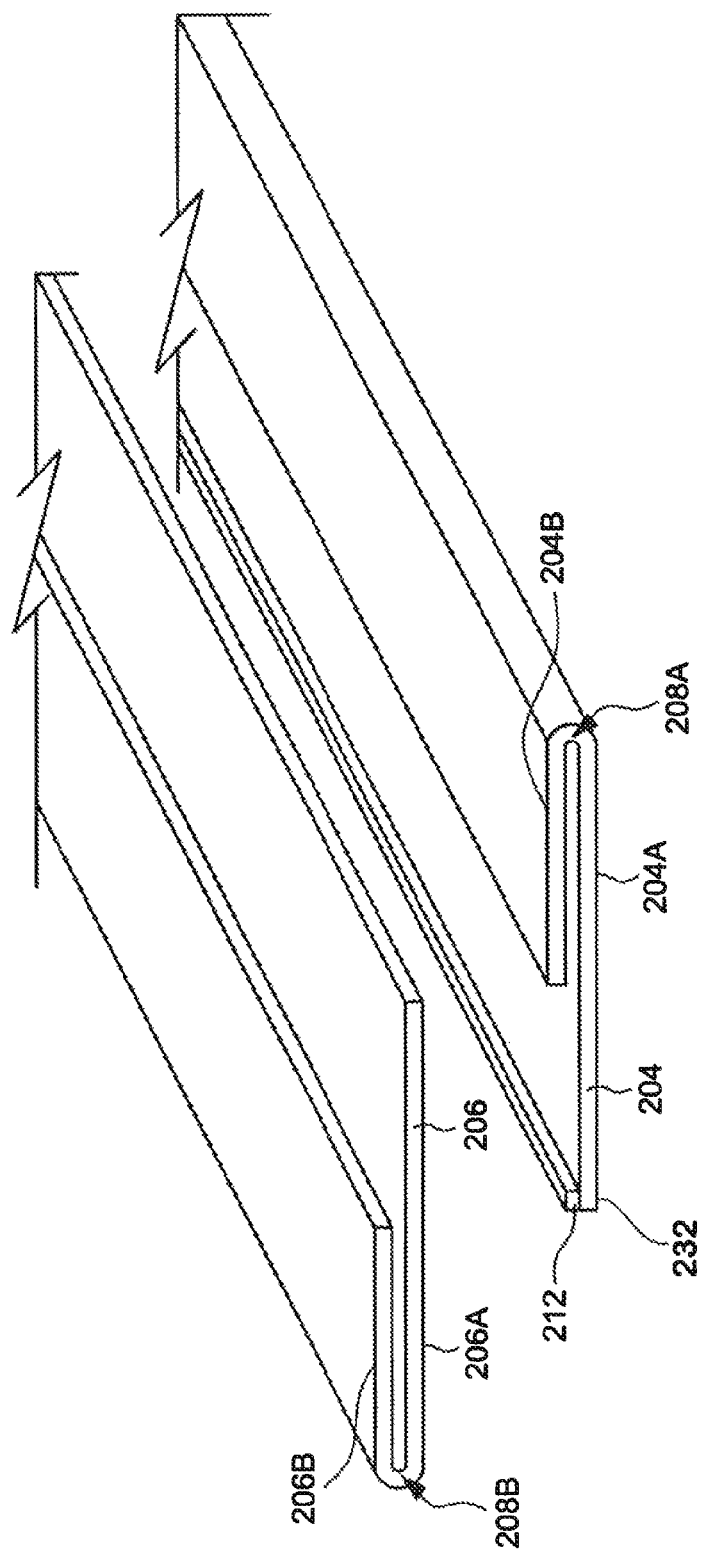
FIG. 11 is a side perspective view of the next stage after FIG. 10 in the fabrication of the substrate of double-cell units used in the double-cell structure of FIG. 8.

Referring to FIG. 11, the strip of glue 212 is then dispensed on an inner surface of the first base 204A at a distal end 232 opposite the pleat 208A.

Figure 12:
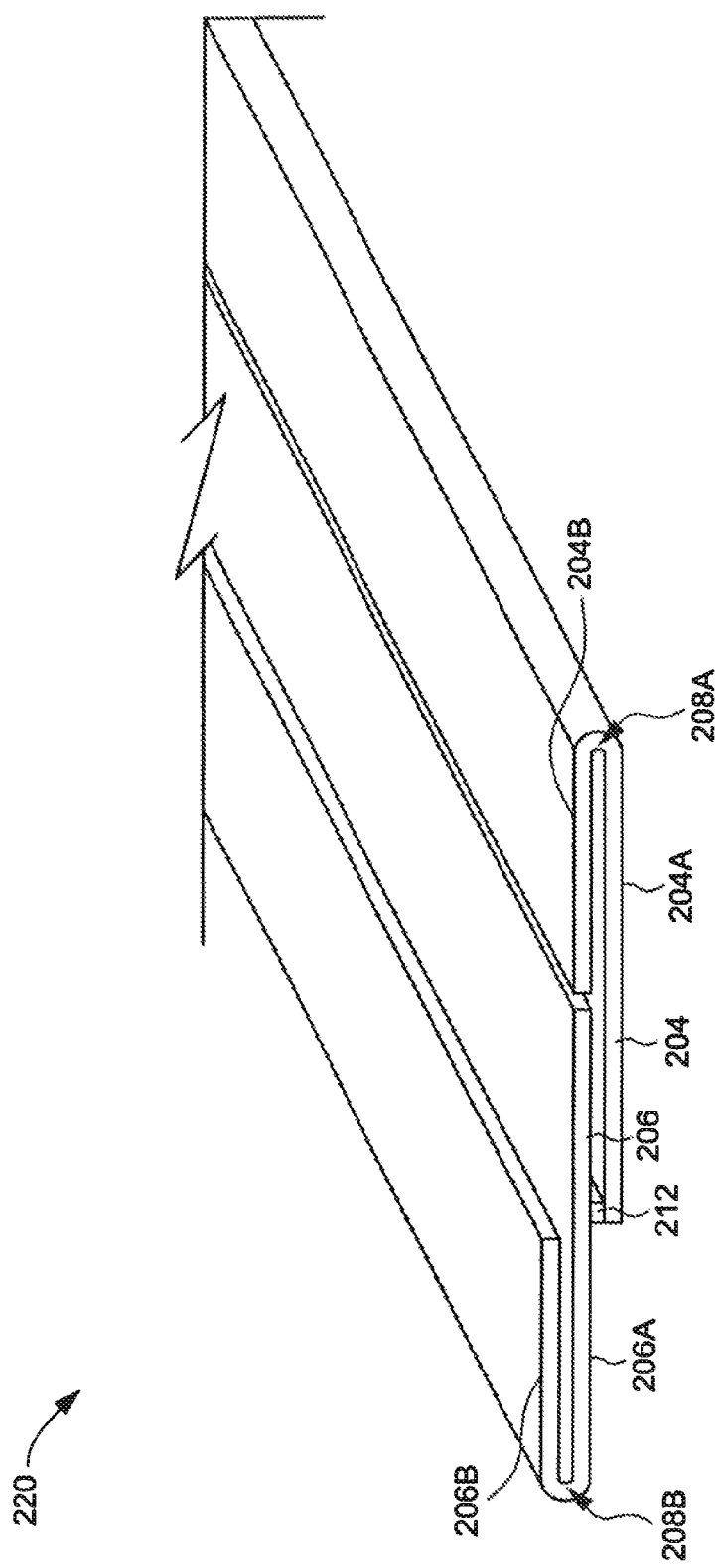
FIG. 12 is a side perspective view of the next stage after FIG. 11 in the fabrication of the substrate of double-cell units used in the double-cell structure of FIG. 8.

Referring to FIG. 12, the second base 206A of the second strip of web material 206 is placed at an overlapping position with the first base 204A of the first strip of web material 204. Subsequently, the outer surface of the second base 206A is bonded via the strip of glue 212 with the inner surface of the first base 204A to form a substrate 220 of the double-cell unit 202. The substrate 220 has an elongated shape having a length and a depth, the length of the substrate 220 corresponding to the length of the bonded first and second strips of web material 204 and 206, and the depth corresponding to the distance between the two opposite pleats 208A and 208B. In one example, the substrate 220 may be wound into a log or roll shape for facilitating its storage for subsequent processing steps.

Figure 13:
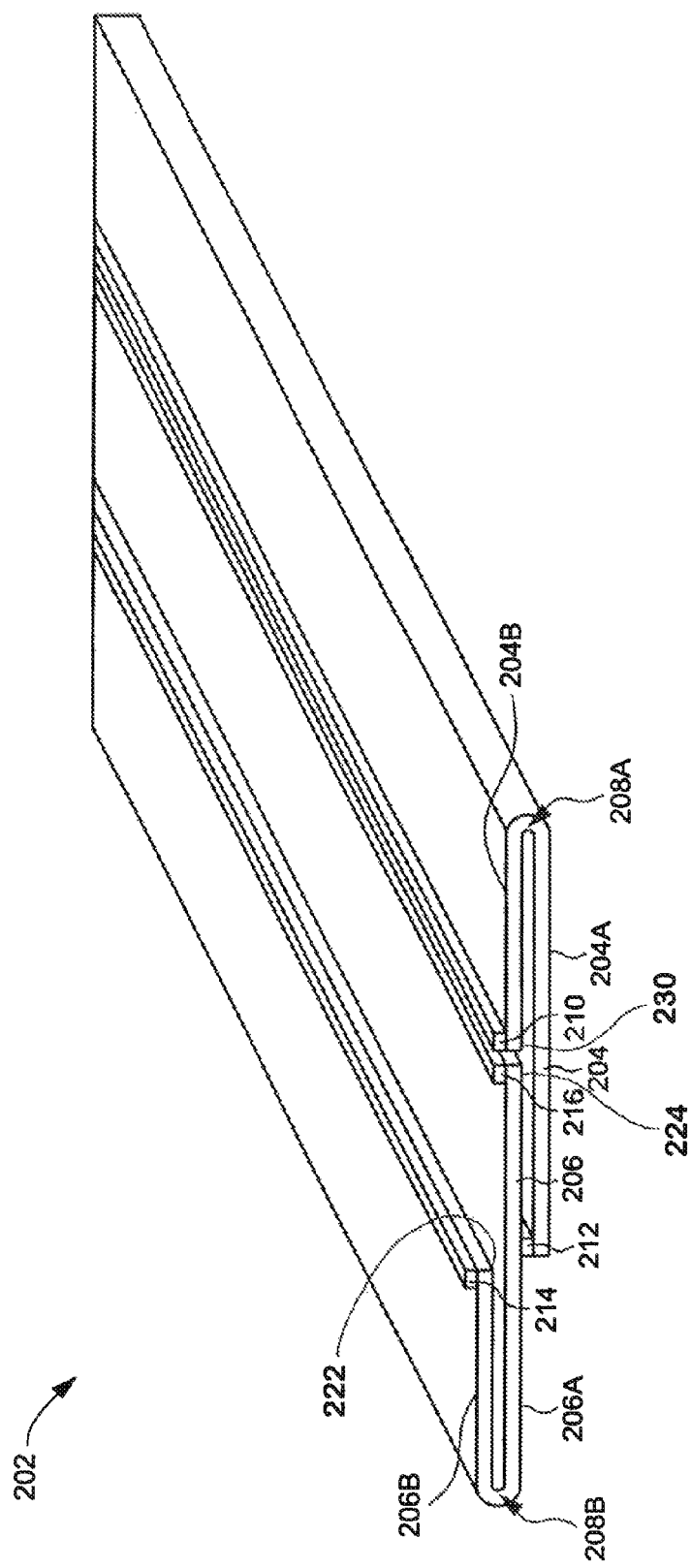
FIG. 13 is a side perspective view illustrating the fabrication of the double-cell structure of FIG. 8 from the substrate shown in FIG. 12.

Referring to FIG. 13, the substrate 220 can then be unwound and cut according to a width of the window shade to form one double-cell unit 202. The strips of glue 210, 214 and 216 are then dispensed on a same side of the double-cell unit 202. Specifically, the strip of glue 210 is dispensed on an outer surface at a distal end 230 of the first side portion 204B, the strip of glue 214 is dispensed on an outer surface at a distal end 222 of the second side portion 206B, and the strip of glue 216 is dispensed on an inner surface at a distal end 224 of the second base 206A.

Figure 14:
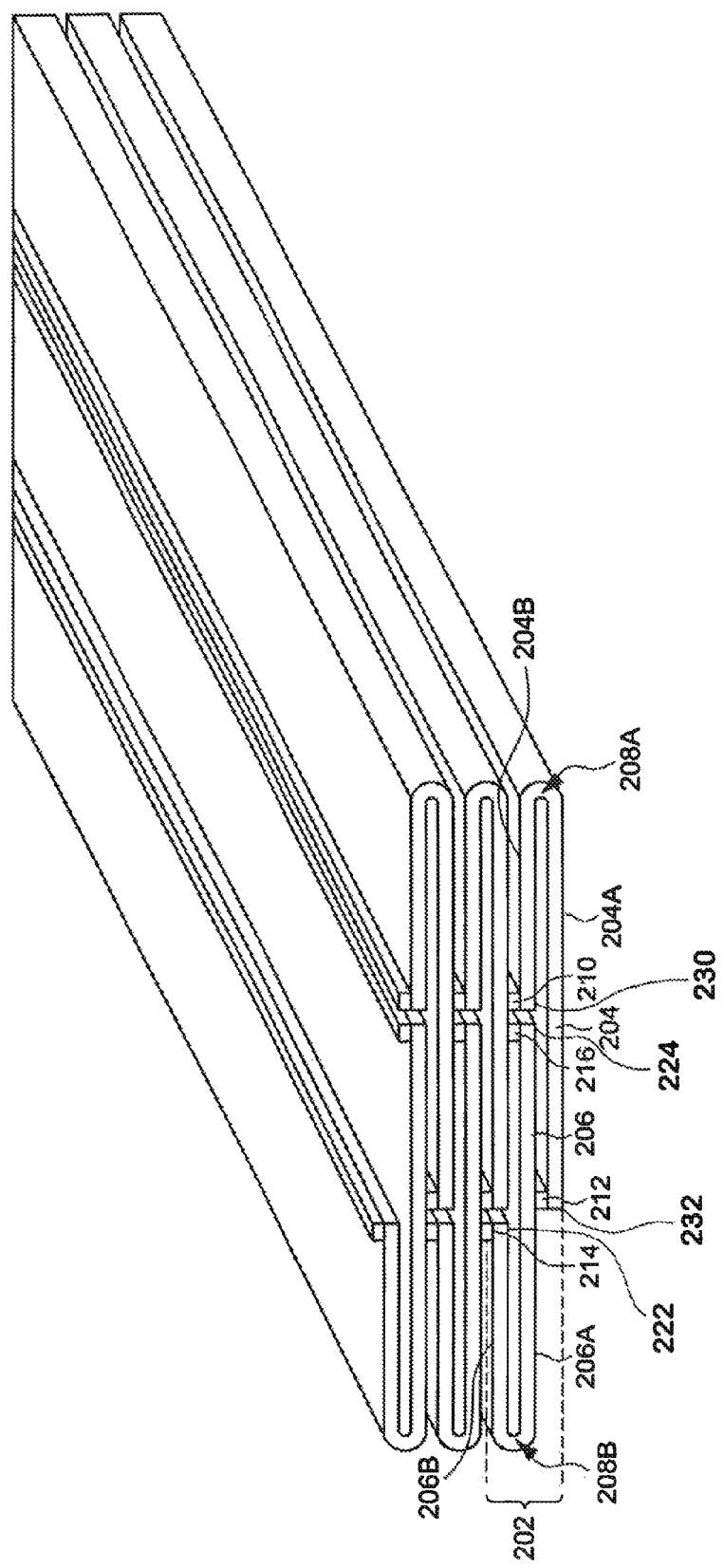
FIG. 14 is a side perspective view illustrating the stacking of the substrate shown in FIG. 12 during the fabrication of the double-cell structure.

Referring to FIG. 14, the double-cell unit 202 provided with the strips of glue 210, 214 and 216 can then be stacked vertically with another adjacent double-cell unit 202. Specifically, the outer surface at the distal end 230 of the first side portion 204B and the inner surface at the distal end 224 of the second base 206A are respectively bonded via the strips of glue 210 and 216 with the outer surface of the adjacent first base 204A of the adjacent first strip of web material 204 at the adjacent double-cell unit 202.

The outer surface at the distal end 222 of the second side portion 206B may be bonded through the strip of glue 214 with the outer surface of the adjacent second base 206A of the adjacent second strip of web material 206 at the adjacent double-cell unit 202. In one embodiment, the bonding location of the strip of glue 214 may be adjacent and proximate to the bonding location of the strip of glue 212, such that each pair of adjacent cells 202A and 202B can have approximately the same shape and size.

With the above structures and methods, a double-cell structure can be fabricated in a cost-effective manner from a substrate formed by connecting two strips of web material. Because the opposite outer surfaces of the double-cell structure are comprised of pleats without any seam lines, the overall aesthetic appearance of the window shade can be improved.

At least one other advantage of this double-cell configuration would permit the production of a window shade that has a functional opaque first strip of material for blocking light and has a second strip of material that can be one of a variety of colors so as to aesthetically match the interior furnishings of a home, office or any room. For example, the window shade can be customized with a second strip of material having a specific color, pattern or design that will allow customers to purchase window shades that match the inside furnishings or color schemes of a home or office. Meanwhile, the opaque first strip of material would generally not be visible when the window shade is viewed from the interior of the room thereby providing a generally aesthetic appearance.

Figure 15:
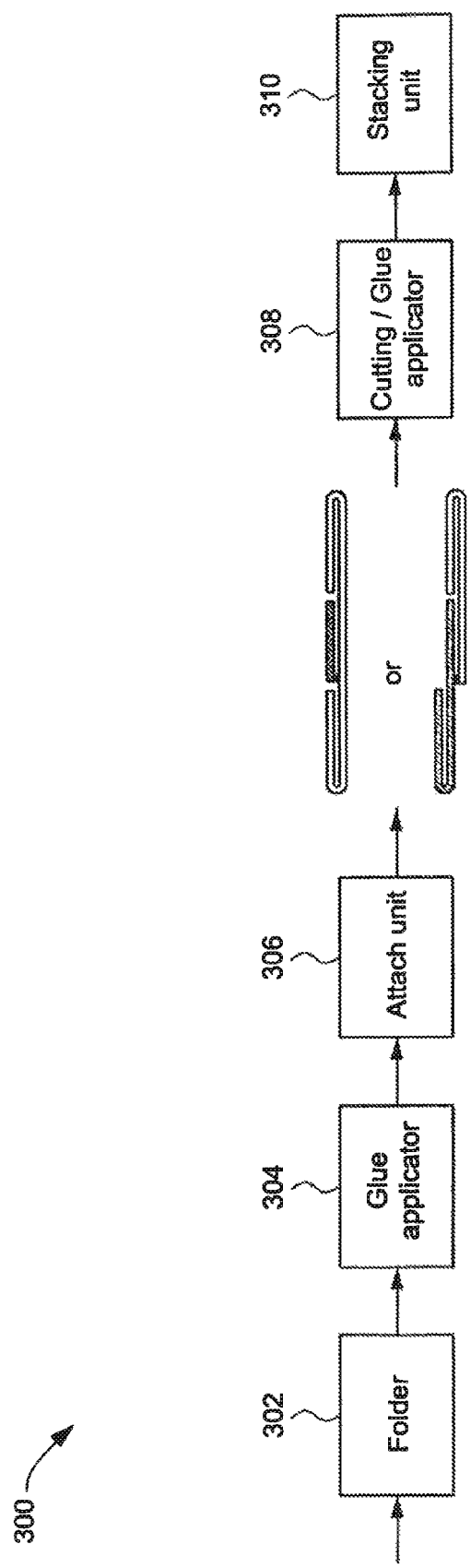
FIG. 15 is a block diagram illustrating a system for fabricating a double-cell structure.

FIG. 15 is a block diagram illustrating a system 300 for fabricating a double-cell structure for a window shade. The system 300 may be implemented as a continuous fabrication line, comprising a folding unit 302, a glue applicator 304, a bonding unit 306, a cutter/glue applicator 308 and a stacking unit 310. The folding unit 302 is operable to form pleats in a strip of web material (e.g., the pleats 108A and to 108B of the first strip of web material 104, pleat 208A of the first strip of web material 204 and/or pleat 208B of the second strip of web material 206). In one embodiment, the folding unit 302 can be formed by a plate having bent portions through which the strip of web material may be conveyed to form the desired pleat line. The glue applicator 304 is adapted to dispense a strip of glue along a strip of web material (e.g., strip of glue 110 or 212 along the first strip of web material 104 or 204). The bonding unit 306 is configured to assemble the first strip of web material with the second strip of web material for forming a substrate of double-cell unit (e.g., substrate 120 or 220). In one embodiment, the substrate can also be wound to form a log or roll for facilitating its subsequent processing. For this purpose, the folding unit 302, glue applicator 304 and bonding unit 306 can be integrated into an independent system adapted to form the substrate 120 or 220.

According to the desired width of the window shade, the cutter/glue applicator 308 can cut the substrate to form a double-cell unit (e.g., double-cell unit 102 or 202), and then apply multiple strips of glue thereon (e.g., the strips of glue 112, 114 and 116 of the first embodiment, or strips of glue 210, 214 and 216 of the second embodiment). Subsequently, each double-cell unit can be transferred to the stacking unit 310 one at a time, such that the double-cell units can be successively stacked and bonded with each other to form the double-cell structure.

At least one advantage of the structures and fabrication methods described herein is the ability to form a double-cell structure from multiple strips of web material. Accordingly, the window shade using the double-cell structure can be more versatile in use. For example, different materials of different light transmission rates can be used for the first and second strips of web material to produce contrasted shadowing effects. In case the double-cell structure is used for blocking light, only one side of the double-cell structure needs an opaque web material. Such construction can reduce the fabrication cost, because a smaller amount of opaque web material (usually more expensive than transparent material) is required.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A double-cell structure for a window shade comprising:
a plurality of double-cell units bonded with one another, each double-cell unit comprising:
first strip of web material having a first pleat formed at the rear of the window shade and a second pleat formed at the front of the window shade, the first and second pleats defining a base and two side portions; and
a second strip of web material having a first and second distal end, the first distal end bonded with the base of the first strip of web material, the second distal end and end portions of the two side portions of the first strip of web material bonded with an outer side of an adjacent first strip of web material at an adjacent double-cell unit.

2. The double-cell structure according to claim 1, wherein the two side portions of the first strip of web material are respectively joined with the base at the first and second pleats and are folded toward an inner side of the base and wherein the first distal end of the second strip of web material is bonded at the inner side of the base.

3. The double-cell structure according to claim 2, wherein the second strip of web material is entirely located between the two side portions of the first strip of web material.

4. The double-cell structure according to claim 1, wherein each of the second strips of web material at least partially form one side of a first and second cell within each of the double-cell units and each of the second strips of web material are entirely located within the corresponding double-cell unit.

5. The double-cell structure according to claim 4, wherein the first and second cells each have four sides and at least two sides of the first cell and at least three sides of the second cell are formed by the first strip of web material.

6. The double-cell structure according to claim 4, wherein the first and second cells in each double-cell unit are entirely formed by three strips of web material joined with one another.

7. The double-cell structure according to claim 1, wherein the second distal end of the second strip of web material and an end portion of one of the two side portions of the first strip of web material are bonded at locations proximate to the outer side of the adjacent first strip of web material at the adjacent double-cell unit.

\* \* \* \* \*